United States Patent
Wang et al.

(10) Patent No.: US 12,341,638 B2
(45) Date of Patent: Jun. 24, 2025

(54) OFDM TIME DOMAIN WINDOWING METHOD AND APPARATUS

(71) Applicant: SANECHIPS TECHNOLOGY CO., LTD., Shenzhen (CN)

(72) Inventors: Qiaoyu Wang, Shenzhen (CN); Xing Liu, Shenzhen (CN); Dingming Zhang, Shenzhen (CN); Dong Li, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 563 days.

(21) Appl. No.: 17/776,578

(22) PCT Filed: Nov. 13, 2020

(86) PCT No.: PCT/CN2020/128767
§ 371 (c)(1),
(2) Date: May 12, 2022

(87) PCT Pub. No.: WO2021/093862
PCT Pub. Date: May 20, 2021

(65) Prior Publication Data
US 2022/0385510 A1 Dec. 1, 2022

(30) Foreign Application Priority Data
Nov. 14, 2019 (CN) .......................... 201911114928.1

(51) Int. Cl.
*H04L 27/26* (2006.01)
*H04L 5/00* (2006.01)

(52) U.S. Cl.
CPC ........ *H04L 27/2607* (2013.01); *H04L 5/0007* (2013.01); *H04L 27/2628* (2013.01)

(58) Field of Classification Search
CPC ............... H04L 27/2607; H04L 5/0007; H04L 27/2628; H04L 27/2602
(Continued)

(56) References Cited

U.S. PATENT DOCUMENTS 12,267,170 B2 * 4/2025 Lee ................. H04L 1/1861
12,267,694 B2 * 4/2025 Matsumura ......... H04W 72/046
(Continued)

FOREIGN PATENT DOCUMENTS

CN          102938751 A        2/2013
CN          102957653 A        3/2013
(Continued)

OTHER PUBLICATIONS

International Search Report for Application No. PCT/CN2020/128767, dated Feb. 18, 2021, 4 pages including English translation.
(Continued)

*Primary Examiner* — Khanh Q Dinh
(74) *Attorney, Agent, or Firm* — Morgan, Lewis & Bockius LLP

(57) ABSTRACT

Provided are an orthogonal frequency division multiplexing (OFDM) time domain windowing method and apparatus. The method includes: current OFDM symbol data is parsed according to a configuration task, and an inverse fast fourier transform (IFFT) processing is performed on the current OFDM symbol data to obtain IFFT data; a cyclic prefix (CP) is added to the IFFT data; and a time domain windowing mode of the current OFDM symbol data is determined according to the configuration task, a windowing operation is performed on IFFT data added with the CP according to the determined time domain windowing mode, and IFFT data after performing the windowing operation is output.

11 Claims, 8 Drawing Sheets

(58) Field of Classification Search
USPC .......................................................... 370/329
See application file for complete search history.

(56) References Cited

U.S. PATENT DOCUMENTS

| | | | |
|---|---|---|---|
| 12,267,826 B2* | 4/2025 | Li ......................... | H04W 72/23 |
| 12,267,863 B2* | 4/2025 | Patil ..................... | H04W 76/14 |
| 12,267,887 B2* | 4/2025 | Hwang .................. | H04W 4/40 |
| 2003/0063556 A1* | 4/2003 | Hernandez .......... | H04L 27/2614 |
| | | | 370/208 |
| 2003/0086363 A1* | 5/2003 | Hernandez .......... | H04L 27/2614 |
| | | | 370/480 |
| 2006/0153309 A1* | 7/2006 | Tang .................... | H04L 5/0044 |
| | | | 375/260 |
| 2007/0009056 A1* | 1/2007 | Yeon ................... | H04L 27/2607 |
| | | | 375/260 |
| 2009/0059781 A1* | 3/2009 | Tseng ................. | H04L 27/2647 |
| | | | 370/201 |
| 2009/0296784 A1* | 12/2009 | Kirsch ................ | H04J 11/0066 |
| | | | 375/E1.001 |
| 2013/0129017 A1* | 5/2013 | Sahin ................ | H04L 27/26265 |
| | | | 375/296 |
| 2019/0013890 A1* | 1/2019 | Mizutani .................. | H04J 1/00 |
| 2020/0213168 A1* | 7/2020 | Bala .................. | H04L 27/26524 |

FOREIGN PATENT DOCUMENTS

| | | | | | |
|---|---|---|---|---|---|
| CN | 104639281 | A | | 5/2015 | |
| CN | 105516032 | A | | 4/2016 | |
| CN | 106878222 | A | | 6/2017 | |
| CN | 107204952 | A | | 9/2017 | |
| CN | 109565679 | A | | 4/2019 | |
| CN | 112804177 | A | * | 5/2021 | ......... H04L 27/2602 |
| CN | 118263892 | A | * | 6/2024 | |
| JP | 3979789 | B2 | * | 9/2007 | |
| WO | WO-2014123926 | A1 | | 8/2014 | |

OTHER PUBLICATIONS

Chinese Search Report for Application No. 201911149281, dated Apr. 18, 2023, 8 pages including English translation.
Chinese Office Action for Application No. 201911149281, dated Apr. 18, 2023, 12 pages including English translation.

* cited by examiner

OFDM TIME DOMAIN WINDOWING METHOD AND APPARATUS

CROSS-REFERENCE TO RELATED APPLICATIONS

This is a National Stage Application filed under 35 U.S.C. 371 based on International Patent Application No. PCT/CN2020/128767, filed on Nov. 13, 2020, which claims priority to Chinese Patent Application No. 201911114928.1 filed on Nov. 14, 2019, the disclosures of both of which are incorporated herein by reference in their entireties.

TECHNICAL FIELD

The present application relates to the field of communications and, for example, to an orthogonal frequency division multiplexing (OFDM) time domain windowing method and apparatus.

BACKGROUND

In a conventional parallel data transmission system, the entire signal frequency band is divided into N mutually non-overlapping frequency sub-channels. Each sub-channel transmits an independent modulation symbol, and then the N sub-channels are frequency multiplexed. This way of avoiding overlapping of the channel spectrum appears to be advantageous in eliminating the interference between channels, but this does not make efficient use of spectrum resources.

In a process of evolution to the 3rd generation mobile communication system (3G)/the 4th generation mobile communication system (4G)/the 5th generation mobile communication system (5G), an OFDM is a multi-carrier transmission manner capable of fully utilizing the spectrum resources, the diversity, space-time coding, interference and inter-channel interference suppression and the intelligent antenna technology may be combined, and the system performance is improved to the maximum extent. The OFDM may well resist the frequency selective fading of wireless channels, and multipath effects and the radio frequency interference on narrow bands are suppressed. A channel allocation condition of the conventional frequency division multiplexing and the OFDM is shown in FIG. 1, and it can be seen from FIG. 1 that the OFDM can save at least one half of spectrum resources.

The OFDM utilizes inverse fast fourier transform (IFFT) and fast fourier transform (FFT) to achieve the modulation and demodulation, and the processing flow is shown in FIG. 2.

A modulation and demodulation process of the OFDM is as follows:

1, when data is transmitted by a transmitter, high-speed serial data is converted into low-speed parallel data, and a data transmission is performed by using multiple orthogonal subcarriers; 2, multiple subcarriers use independent modulators and demodulators; 3, the complete orthogonality between the multiple subcarriers and the complete synchronization of reception and transmission of the multiple subcarriers are required; 4, the transmitter and a receiver need to be precisely same frequency, synchronous and accurately perform a bit sampling; and 5, the receiver performs a synchronous sampling at a rear end of the demodulator to obtain data, and then the data is converted into a high-speed serial.

The multi-carrier characteristic and the channel time-varying characteristic of an OFDM system determine that the OFDM system has strict requirements on the orthogonality of subcarriers in the channel, and the frequency deviation can cause interference between the subcarriers. Therefore, a main problem of the OFDM technology is that it is very sensitive to the frequency offset of the receiving and transmitting carriers, and if the frequency offset occurs, the inter-subcarrier interference occurs, whereby an error rate of a receiving terminal is increased, and thus the performance of the system is significantly reduced.

Meanwhile, since the computer cannot realize the FFT operation and measurement of infinitely long signals, a finite long sequence should be intercepted for analysis. An infinitely long sequence is suddenly truncated, which is equivalent to multiplying a rectangular window in a time domain, and data within the window does not change. In a frequency domain, an infinitely long sequence is suddenly truncated, which is equivalent to the periodic convolution of a frequency spectrum of the infinitely long sequence and a frequency spectrum of a sequence within a rectangular window, and the energy originally concentrated at a base is dispersed into two wider frequency bands, so that the spectrum energy leakage is generated, and thus the frequency diffusion distortion is generated. Different interception window functions are adopted to truncate the signals, so that the spectrum energy leakage may be reduced, and the spectrum energy leakage is closely related to the window function spectrum characteristics.

The signal is intercepted by using a slowly changing window function, and a sampling frequency n times higher than a signal frequency is a common method for solving spectrum energy leakage. If the window function energy is relatively concentrated on a main lobe and amplitudes of two side lobes tend to be zero, then a signal spectrum may be really restored. An ideal window function should have the characteristics of narrow main lobe width, low side lobe width and high side lobe attenuation speed.

In a traditional processing flow, the windowing processing and the FFT data processing are performed independently. A traditional scheme is relatively simple in design and is effective in a scene with a small flow rate. However, as protocols evolve and system capacities increase, such as a 4G/5G system, capacities of the system increase dramatically, requirements on processing latency are high, and data processing volumes also increase dramatically. If a traditional scheme is also employed, then bandwidth requirements for an external memory are very high, the performance cannot be effectively improved, and the power consumption will be drastically increased.

SUMMARY

Embodiments of the present application provide an orthogonal frequency division multiplexing (OFDM) time domain windowing method and apparatus, so as to at least solve the problems of large processing delay and relatively high power consumption caused by a fact that a windowing of OFDM and an FFT (Fast Fourier Transform) data processing are independently performed in the related art.

According to an embodiment of the present application, an OFDM time domain windowing method is provided. The method includes described below. Current OFDM symbol data is parsed according to a configuration task, and an inverse fast fourier transform (IFFT) processing is performed on the current OFDM symbol data to obtain IFFT data; a cyclic prefix (CP) is added to the IFFT data; and a time domain windowing mode of the current OFDM symbol data is determined according to the configuration task, a windowing operation is performed on IFFT data added with the CP according to the determined time domain windowing mode, and IFFT data after performing the windowing operation is output.

According to another embodiment of the present application, an OFDM time domain windowing apparatus is provided. The apparatus includes an IFFT processing module, a cyclic prefix module and a windowing module. The IFFT processing module is configured to parse current OFDM symbol data according to a configuration task, and perform an inverse fast fourier transform (IFFT) processing on the current OFDM symbol data to obtain IFFT data. The cyclic prefix module is configured to add a cyclic prefix (CP) to the IFFT data. The windowing module is configured to determine a time domain windowing mode of the current OFDM symbol data according to the configuration task, perform a windowing operation on IFFT data added with the CP according to the determined time domain windowing mode, and output IFFT data after performing the windowing operation.

According to still another embodiment of the present application, a non-transitory computer-readable storage medium is further provided. The non-transitory computer-readable storage medium stores a computer program, where the computer program is configured to, when executed, perform the steps of any of the method embodiments described above.

According to still another embodiment of the present application, an electronic apparatus is further provided. The electronic apparatus includes a memory and a processor, where the memory stores a computer program, and the processor is configured to execute the computer program to perform the steps of any of the method embodiments described above.

BRIEF DESCRIPTION OF DRAWINGS

The drawings described herein serve to provide a further understanding of the present application and constitute a part of the present application, and illustrative embodiments of the present application and descriptions thereof serve to explain the present application and are not to unduly limit the present application. In the drawings.

DETAILED DESCRIPTION

The present application will hereinafter be described in conjunction with embodiments and with reference to the accompanying drawings. The terms "first," "second," and the like in the Description and claims of this application, and in the foregoing drawings, are used for distinguishing between similar objects and not necessarily for describing a particular order or sequential order.

Figure 1:
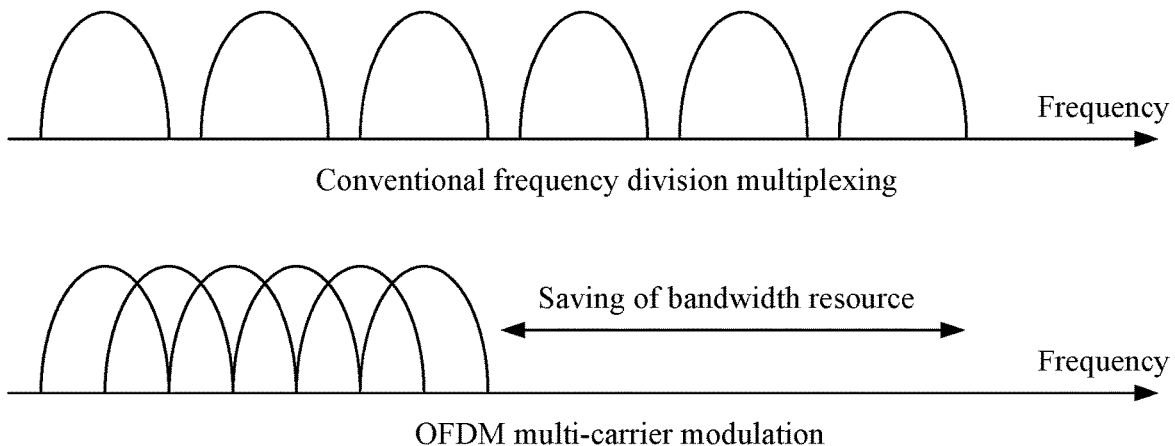
FIG. 1 is a schematic diagram showing a channel allocation condition of a frequency division multiplexing and an OFDM according to the related art.
Figure 2:
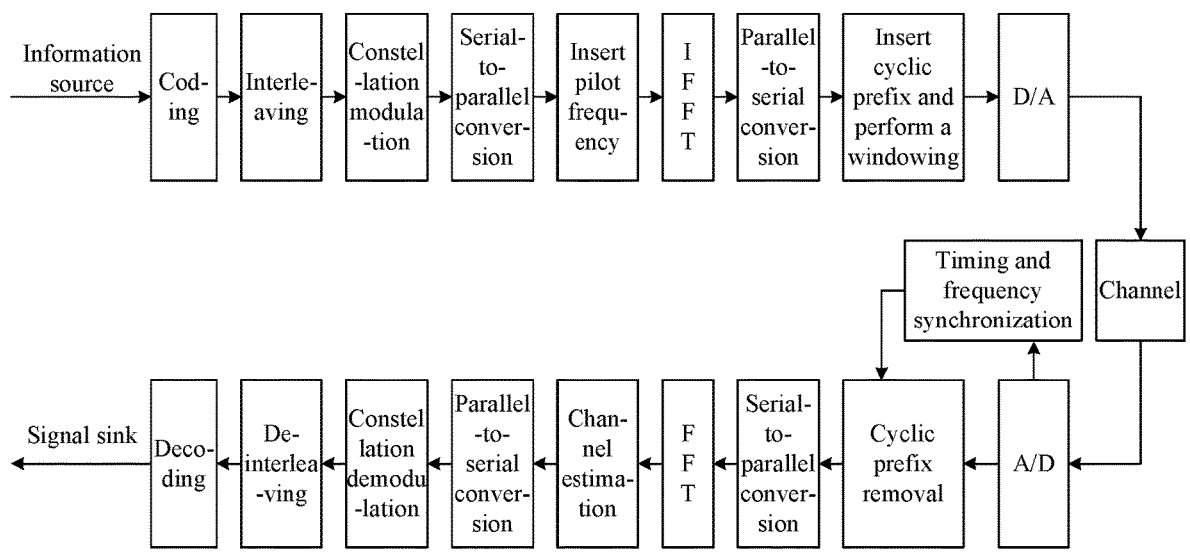
FIG. 2 is a processing flowchart of an OFDM data according to the related art.
Figure 3:
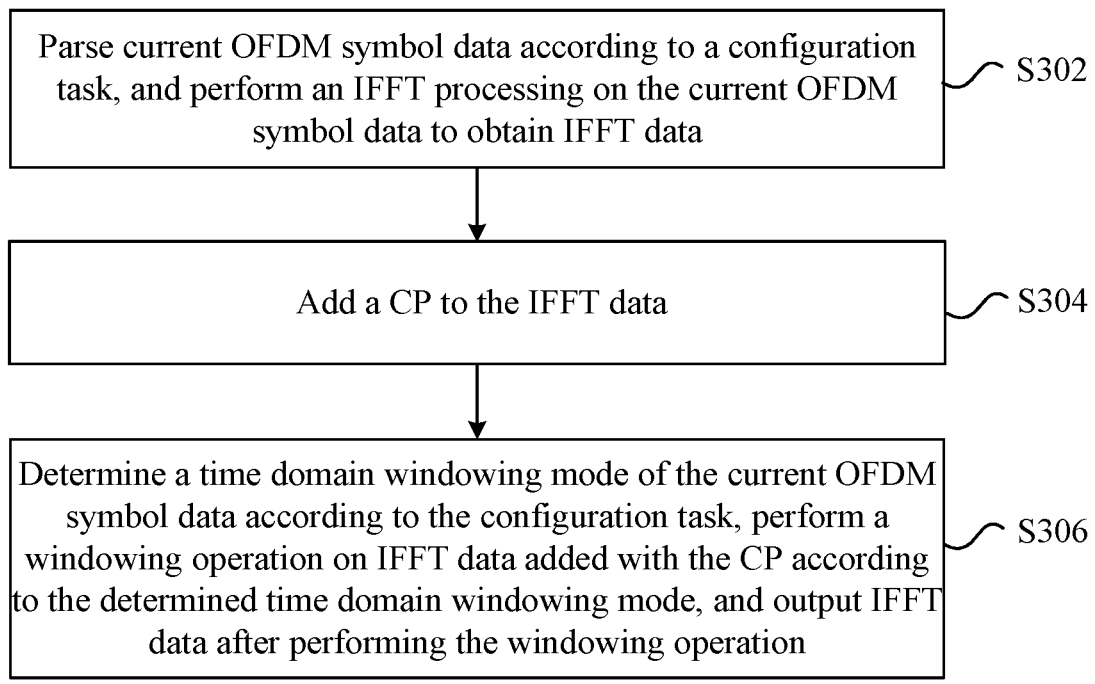
FIG. 3 is a flowchart of an OFDM time domain windowing method according to an embodiment of the present application.

In this embodiment, an OFDM time domain windowing method is provided, and FIG. 3 is a flowchart of a method according to an embodiment of the present application, as shown in FIG. 3, the process includes the following:

In S302, current OFDM symbol data is parsed according to a configuration task, and an inverse fast fourier transform (IFFT) processing is performed on the current OFDM symbol data to obtain IFFT data.

In S304, a cyclic prefix (CP) is added to the IFFT data.

In S306, a time domain windowing mode of the current OFDM symbol data is determined according to the configuration task, a windowing operation is performed on IFFT data added with the CP according to the determined time domain windowing mode, and IFFT data after performing the windowing operation is output.

Before the S302 of this embodiment, the method may further include: a task configuration is performed on the current OFDM symbol data, where the configuration task includes a task parameter, a reading address of windowing data, and a windowing coefficient of windowing data.

In the S306 of this embodiment, when the time domain windowing mode is a windowing bypass mode, the IFFT data added with the cyclic prefix (CP) is directly output to a subsequent module.

When the time domain windowing mode is a first windowing mode, data with a length of A0 is acquired from a head of a previous OFDM symbol to be copied as a cyclic suffix, and a data segment B1 with a length of 2×A0 is formed by the cyclic suffix and last data with a length of A0 of the previous OFDM symbol; data with the length of A0 is acquired from a head of the CP of a current OFDM symbol and then data with the length of A0 before the CP is acquired to form a data segment A2 with the length of 2×A0, where a length of 2×A0 is equal to a length of the CP; the data segment A2 is multiplied by a rising window coefficient, the data segment B1 is multiplied by a falling window coefficient, then they are superimposed to obtain a data segment C; and the last data with the length of A0 of the previous OFDM symbol is replaced with data with a front length of A0 of the data segment C, and data with the front length of A0 of the CP of the current OFDM symbol is replaced with data with a rear length of A0 of the data segment C.

When the time domain windowing mode is a second windowing mode, data with a length of 2×A0 is acquired from a head of a previous OFDM symbol to be copied as a cyclic suffix data segment B1, where the length of 2×A0 is less than or equal to a length of the CP; a data segment A1 with the length of 2×A0 is acquired from a head of the CP of a current OFDM symbol; and the data segment A1 is multiplied by a rising window coefficient to obtain windowing data of the data segment A1, the data segment B1 is multiplied by a falling window coefficient to obtain windowing data of the data segment B1, and the windowing data of the data segment A1 and the windowing data of the data segment B1 are superposed to obtain a data segment C, the data segment A1 of the current OFDM symbol is replaced with the data segment C, and a remaining data segment A2 of the CP of the current OFDM symbol is reserved as the CP.

When the time domain windowing mode is a third windowing mode, a data segment A with a length of 2×A0 is acquired from a head of a CP of a current OFDM symbol, where the length of 2×A0 is less than a length of the CP; the data segment A is multiplied by a rising window coefficient to replace data of the data segment A; and a data segment B with the length of 2×A0 is acquired from a last symbol of the current OFDM symbol, and the data segment B is multiplied by a falling window coefficient to replace data of the data segment B.

After the S306 of this embodiment, the method may further include: the IFFT data after performing the windowing operation is collated, and the collated IFFT data is transmitted through a wireless channel.

In the above embodiments of the present application, the IFFT conversion step and the windowing step in an OFDM system are combined together for processing by utilizing the algorithm characteristic and the data reading and writing characteristic of the OFDM, and a processing mode of a time domain windowing aiming at different scenarios is enhanced, so that the processing delay is reduced, the power consumption is reduced, the system performance is improved, and thus the transmission quality of received signals is enhanced.

In order to facilitate understanding of the technical scheme provided in the embodiments of the present application, the following will be described in connection with embodiments of application scenarios.

A technical problem to be solved by this embodiment is to enhance the configuration flexibility of a time domain windowing processing, reduce the comprehensive processing delay of windowing and IFFT operation, improve the system performance, and reduce the system power consumption.

The time domain windowing has the following characteristics.

1. the windowing operation follows the IFFT operation.
2. the rising window coefficient and the falling window coefficient of the window coefficient are symmetrical, and only half of the window coefficient needs to be stored.
3. for a windowing processing of two related operations, data of a previous symbol needs to be cached, so that a windowing processing operation is performed.
4. a data volume of the windowing operation is less than a data volume of the CP.

This embodiment utilizes the time domain windowing features described above, and provides a time domain windowing method for a wireless communication system, as shown in FIGS. 4 to 7, the method mainly includes the following procedures.

Task issuing: an external main control module sends a processing task configuration to an IFFT processing module.

Windowing mode determination: four windowing modes, namely a windowing bypass mode, a windowing mode 1, a windowing mode 2 and a windowing mode 3, are included. The task issuing performs a switch configuration through a register. If the mode is the windowing bypass mode, then the IFFT data after performing the IFFT operation is directly bypassed. If the mode is the windowing mode 1, then it jumps to a processing flow of the windowing mode 1. If the mode is the windowing mode 2, then it jumps to a processing flow of the windowing mode 2. If the mode is the windowing mode is 3, then it jumps to a processing flow of the windowing mode 3.

Add CP: the cyclic prefix is increased.

Data collation: the data is collated in preparation for sending.

Data sending: the data is sent to a subsequent module for processing.

The processing of the four windowing modes described above will be described below, respectively.

Figure 4:
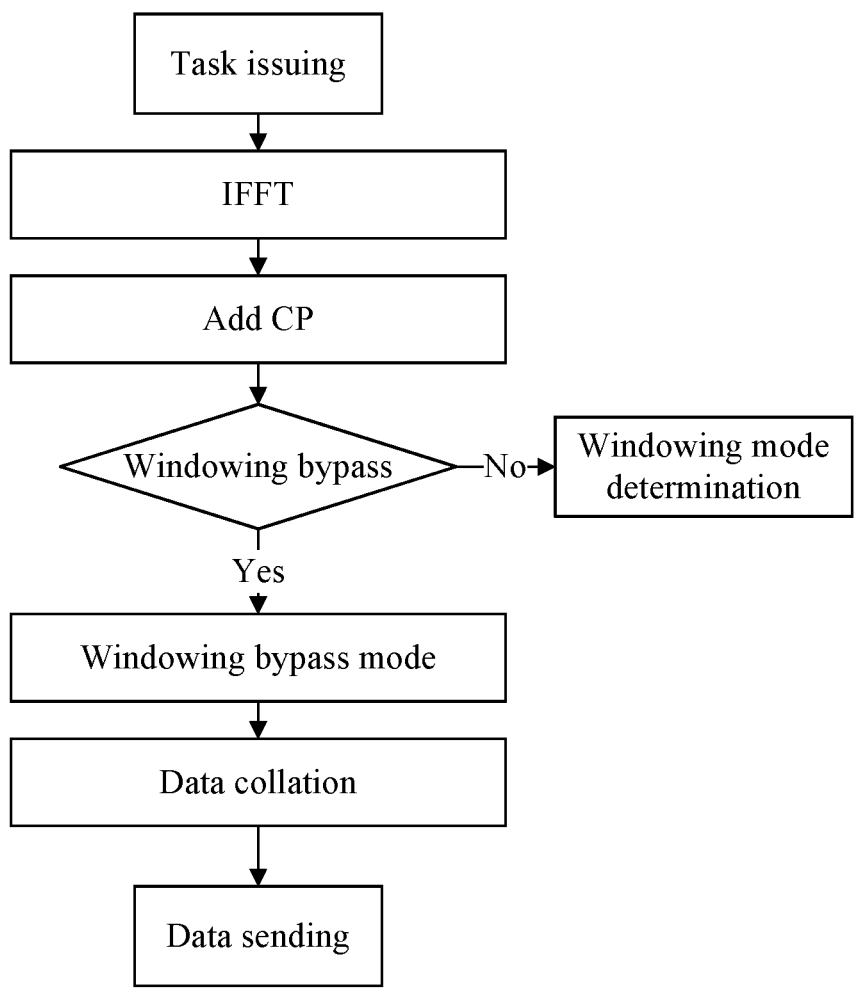
FIG. 4 is a processing flowchart of a windowing bypass mode according to an embodiment of the present application.

FIG. 4 is a processing flow for a windowing bypass mode, as shown in FIG. 4, when configured as the windowing bypass mode, IFFT data added with the cyclic prefix (CP) is directly output to a subsequent module. That is, a data collation is performed to make a preparation for a data sending, and then the data is sent to a subsequent module for processing.

Figure 5:
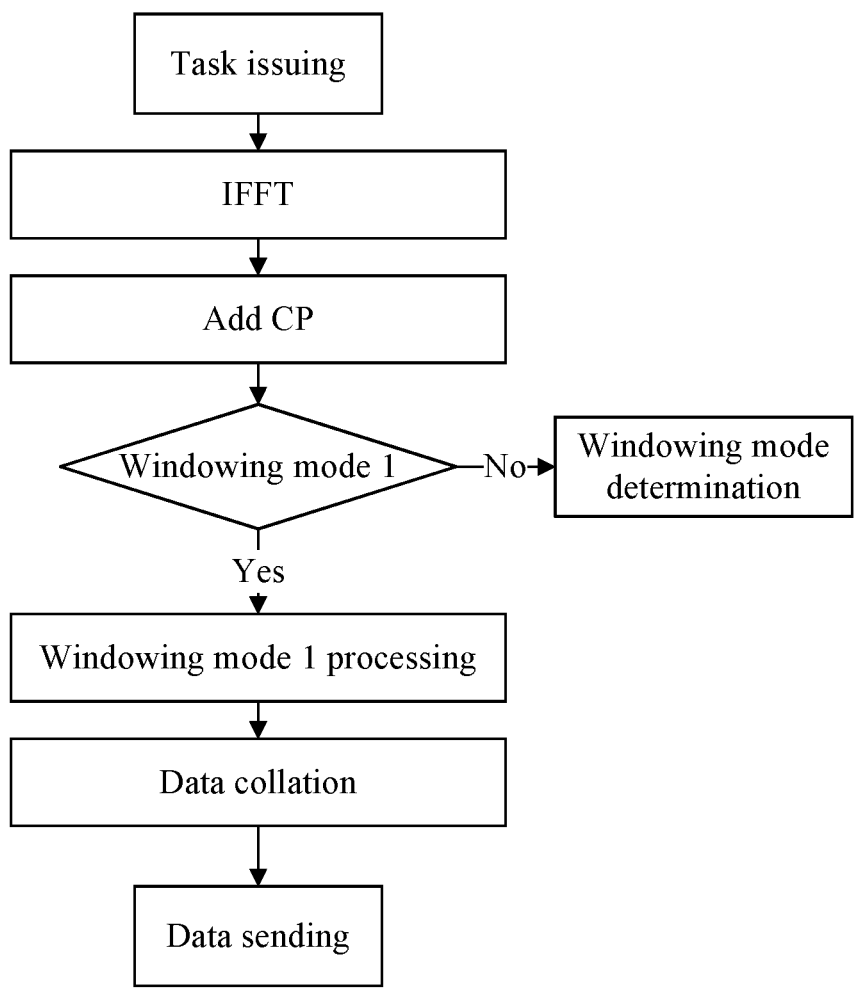
FIG. 5 is a processing flowchart of a windowing mode 1 according to an embodiment of the present application.
Figure 8:
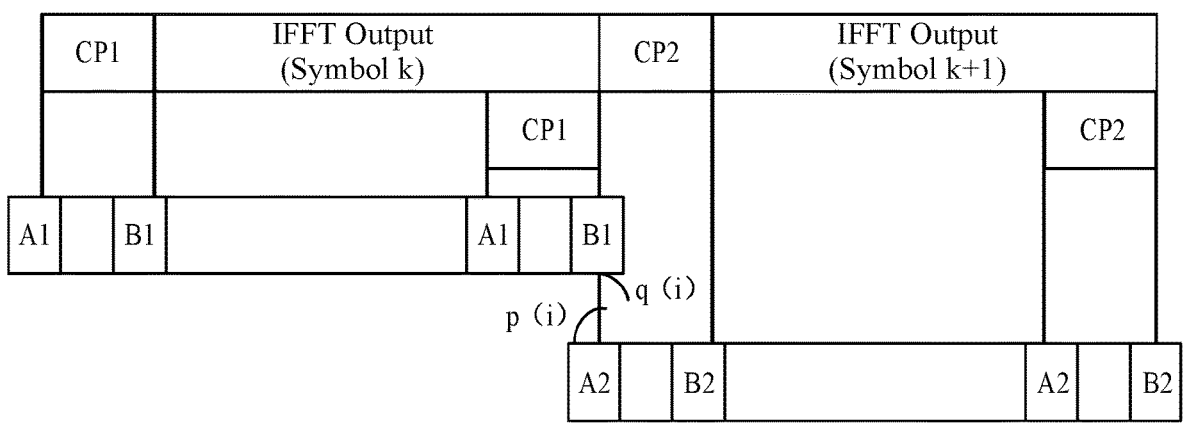
FIG. 8 is a schematic diagram of an implementation of a windowing mode 1 according to an embodiment of the present application.

FIG. 5 is a processing flow of a windowing mode 1. FIG. 8 is a process schematic diagram of an implementation of the windowing mode 1. As shown in FIG. 8, firstly, data with a length of A0 is acquired from a head of a previous symbol k to be copied as a cyclic suffix, and then a data segment B1 is formed by the cyclic suffix and last data with a length of A0 of the symbol k, a length of the data segment B1 is 2×A0. Then data with the length of A0 is acquired from a head of a CP of the next symbol k+1, point data with the length of A0 before the CP is acquired, and data with a total length of 2×A0 is formed to serve as a data segment A2. The data segment A2 is multiplied by a rising window coefficient, the data segment B1 is multiplied by a falling window coefficient, and they are superposed to obtain a data segment C. The data of the last length of A0 of the symbol k is replaced with the data with the front length of A0 of the data segment C; and data with a front length of A0 of a CP of the symbol k+1 is replaced with data with a rear length of A0 of the data segment C.

In this mode, the length of 2×A0 must be equal to the length of the CP. Each symbol is shifted forward by at least A0 points, i.e., data with a rear length of A0 of the symbol k is output along with the symbol k+1. Therefore, during processing of the symbol k, the data obtained by multiplying the data segment B1 of the symbol k by the falling window coefficient needs to be output to a memory address indicated by win_addr and win_addr offset to be cached, and when the k+1 symbol is processed, and data windowed with the data segment A2 of the symbol k+1 is read out to complete a superposition processing.

In this mode, at least the data of 2×A0 needs to be buffered, and meanwhile, considering that a number of FFT points and window lengths of two adjacent symbols are not consistent in a dynamic transmission time interval (TTI) time division scenario, in order to ensure that the processing does not have errors, a parameter Wa (win_data_wa) is used to indicate a data length of the data segment B1 that needs to be buffered, an amount of buffered data is 2×Wa sampling points, and each symbol is shifted forward by Wa points at this Time. Wa must be greater than A0, and Wa+cp_len<=FFT point number, and cp_len is the length of the CP.

Figure 9:
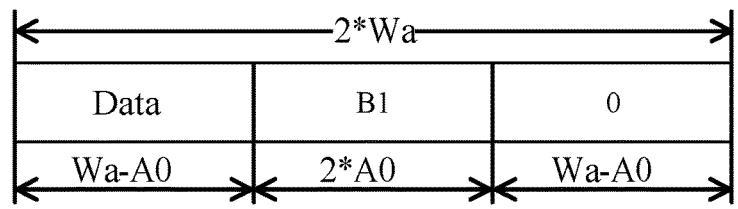
FIG. 9 is a schematic diagram showing a partial data cache in a windowing mode 1 according to an embodiment of the present application.

If Wa>A0, then the output buffer data composition is as shown in FIG. 9. Firstly, data with the length of Wa−A0 before the data segment B1 is output, then data with the length 2×A0 after windowing of the data segment B1 is output, and finally a 0 complementing processing is performed on the residual dot space with the length of Wa−A0 to complement 2×Wa sampling points. The first symbol and the uplink/downlink switching point should assume that the data of the last symbol is all 0.

After the processing in the windowing mode 1 is completed, a data collation is made so as to make a preparation for a data sending, and then the data is sent to a subsequent module for processing.

Figure 6:
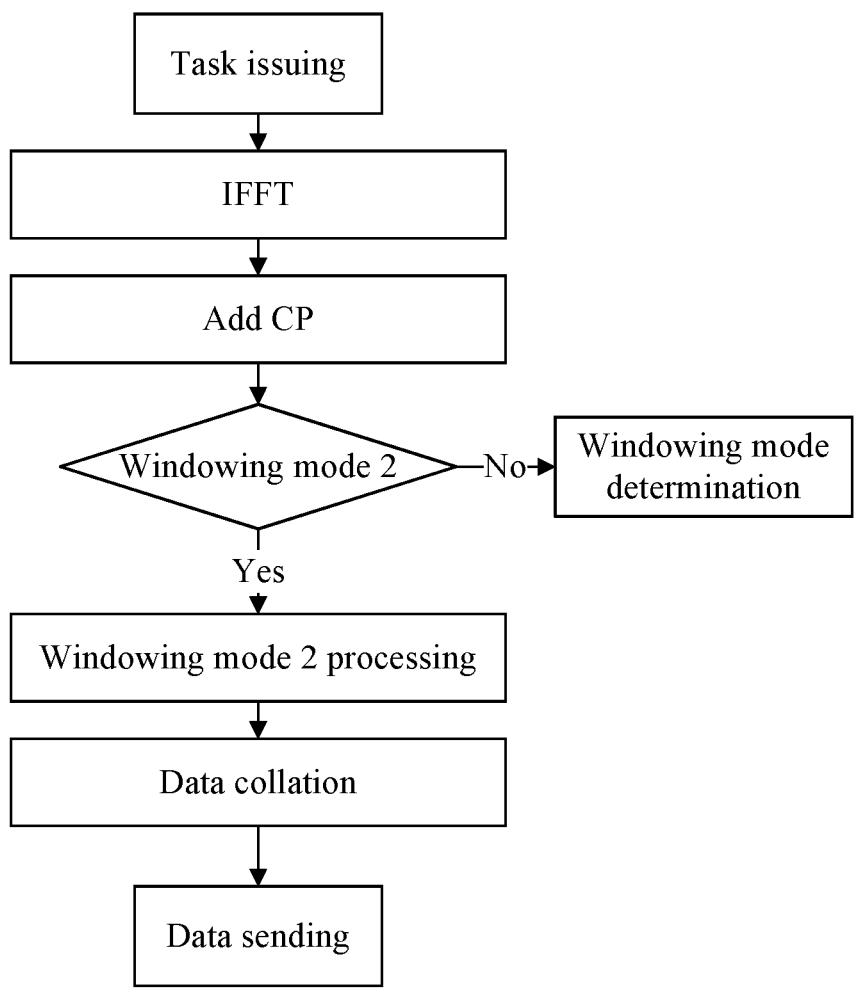
FIG. 6 is a processing flowchart of a windowing mode 2 according to an embodiment of the present application.
Figure 10:
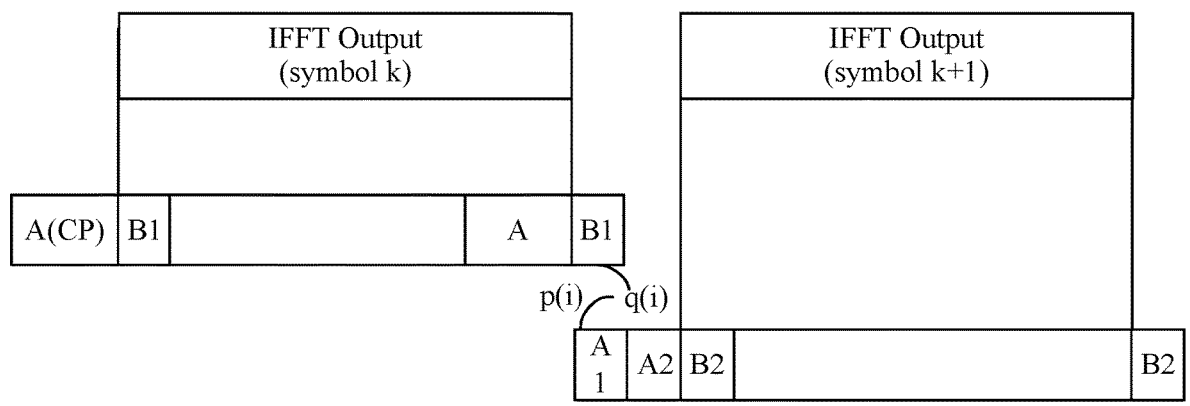
FIG. 10 is a schematic diagram of an implementation of a windowing mode 2 according to an embodiment of the present application.

FIG. 6 is a flowchart of a windowing mode 2. FIG. 10 is a schematic diagram of an implementation process of a windowing mode 2.

As shown in FIG. 10, firstly, a data with a length of 2×A0 is acquired from a head of a previous symbol k is copied as a cyclic suffix (data segment B1). Then, a data segment A1 with a length of 2×A0 is acquired from a head of the CP of the following symbol k+1. The data segment A1 is multiplied by a rising window coefficient, the data segment B1 is multiplied by a falling window coefficient, the windowing data of the data segment A1 and the windowing data of the data segment B1 are superposed to obtain the data C, the data A1 of the symbol k+1 is replaced with the data C, and the remaining part A2 of the CP of the symbol k+1 is reserved as the CP.

In this mode, the length of 2×A0 must be less than or equal to the length of CP. The output data of the FFT is the output of the A1+A2+IFFT for each symbol, since the data segment A1 of symbol k+1 is related to the windowing data of the data segment B1 of the previous symbol k. Therefore, during a symbol k processing, the data obtained after the data segment B1 of the symbol k is multiplied by the falling window needs to be output to a memory address indicated by win_data_addr to be cached, and when the k+1 symbol is processed, and data windowed with the data segment A1 is read out to complete a superposition processing.

The data segment B1 indicates to cache data of 2×A0, but considering that a number of points and window lengths of two adjacent symbols FFT are not consistent in a dynamic TTI time division scenario, in order to ensure that the processing does not have errors, a parameter Wa (win_data_wa) is used for indicating the data length of the data segment B1 to be cached, and an amount of cached data is 2*Wa sampling points. Wa must be greater than or equal to W0, and 2×Wa≤the length of the CP, and W0 is a windowing coefficient.

Figure 11:
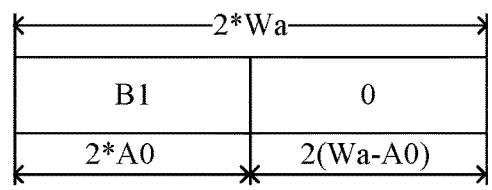
FIG. 11 is a schematic diagram showing a partial data cache in a windowing mode 2 according to an embodiment of the present application.

If Wa>W0, then the output buffered data is shown in FIG. 11. Firstly, The windowing data with the length of 2×A0 of the data segment B1 is output firstly, then a 0 complementing processing is performed on the residual space with the length of 2×(Wa−A0) to complement 2×Wa sampling points. When the power-on first-time work and the uplink and downlink task switching are performed, all the previous symbol data is supposed to be 0.

After the processing in the windowing mode 2 is completed, a data collation is made so as to make a preparation for a data sending, and then the data is sent to a subsequent module for processing.

Figure 7:
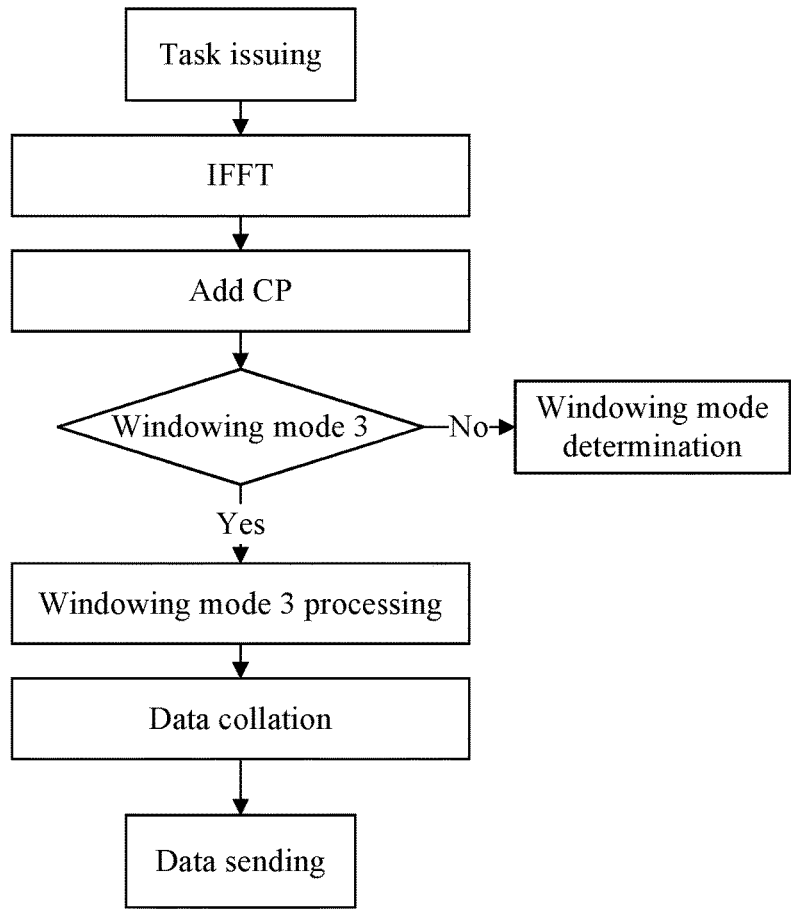
FIG. 7 is a processing flowchart of a windowing mode 3 according to an embodiment of the present application.
Figure 12:
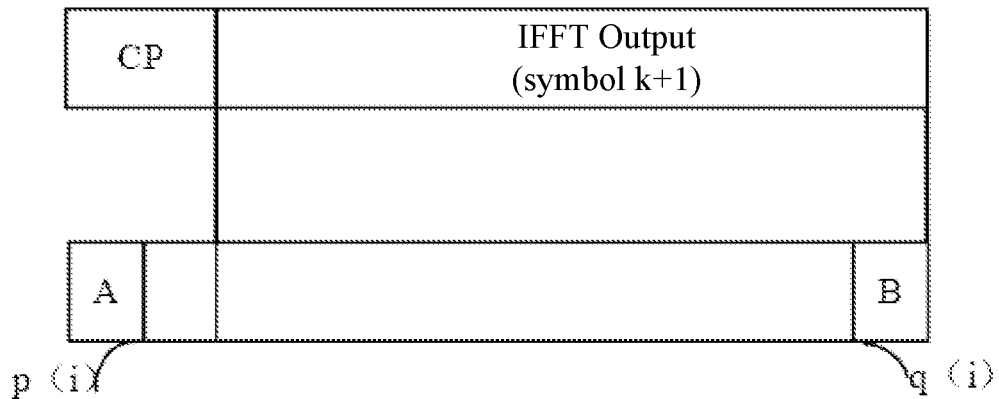
FIG. 12 is a schematic diagram of an implementation of a windowing mode 3 according to an embodiment of the present application.

FIG. 7 is a processing flowchart of a windowing mode 3. FIG. 12 is a schematic diagram of an implementation process of a windowing mode 3. As shown in FIG. 12, this mode is a windowing-only non-overlapping windowing approach, and at this time, two adjacent symbols are not directly coupled. Firstly, a data segment (data segment A) with a length of 2×A0 is acquired from a head of a CP of a symbol k+1, and then the data segment A is multiplied by a rising window coefficient to replace the data segment A. Data (data segment B) with the length of 2×A0 is acquired from a last symbol of the symbol k+1, and then the data segment B is multiplied by a falling window coefficient to replace the data segment B. A and B are only windowed and are not overlapped.

In this mode, the length of 2×A0 must be less than the length of CP.

After processing in the windowing mode 3 is completed, a data collation is made so as to make a preparation for a data sending, and then the data is sent to a subsequent module for processing.

Figure 13:
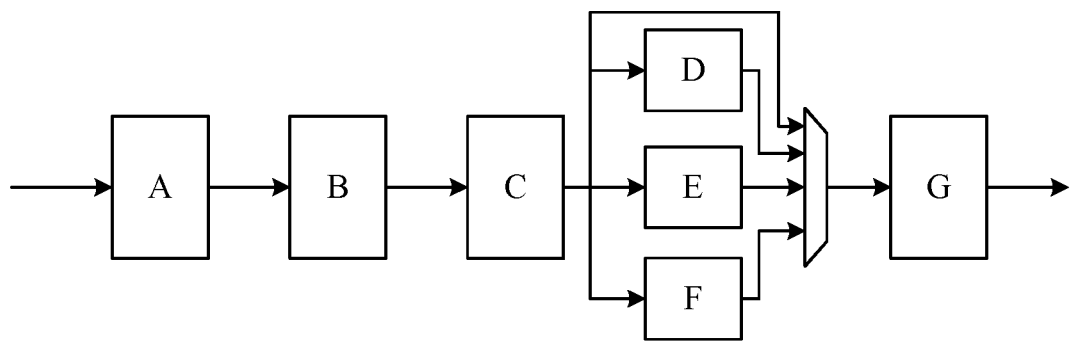
FIG. 13 is a block structure diagram of an implementation of a time domain windowing according to an embodiment of the present application.

An embodiment of the present application further provides a time domain windowing implementation apparatus for a wireless communication system, as shown in FIG. 13, the apparatus includes following modules.

A module A, task configuration: a task parameter, a reading address of windowing data, and a windowing coefficient of windowing data are configured.

A module B, IFFT processing: IFFT is used, the signal is transformed from a discrete frequency domain to discrete time domain as if the signal were multiplied by different sub-carrier frequencies, respectively.

A module C, insert a cyclic prefix: the tail end of the signal is moved to the front end of the signal to reduce the influence of multipath interference on the system.

A module D, a windowing mode 1: a windowing function is multiplied to reduce high frequency signals between two received signals that may arise due to very discontinuous phase angle changes.

A module E, a windowing mode 2: a windowing function is multiplied to reduce high frequency signals between two received signals that may arise due to very discontinuous phase angle changes.

A module F, a windowing mode 3: a windowing function is multiplied to reduce high frequency signals between two received signals that may arise due to very discontinuous phase angle changes.

A module G, a channel transmission: a data transmission is performed through a wireless channel.

The workflow of the above modules will be described below for different windowing modes, respectively:

For the windowing bypass mode, the module A configures tasks, configures current symbol-related data, parameters, and read addresses and data for windowing coefficients. The module B parses the task configured by the module A, and starts to perform an IFFT processing according to the configured parameter. The data with a tail length of CP is acquired from the output data of the module B and is put at the head of the current symbol data queue. The data is directly output to the module G to be transmitted and processed, and is output to a wireless channel.

For the windowing mode 1, the module A configures the task, configures the current symbol related data, parameters, and the read address and data of the windowing coefficient. The module B parses the task configured by the module A, and starts to perform an IFFT processing according to the configured parameter. The data with a tail length of CP is acquired from the output data of the module B and is put at the head of the current symbol data queue. If the module A is configured with the windowing mode 1, and at this time, the data is input into the module D, the module D performs a data caching and windowing operation according to the processing flow of the windowing mode 1, and the current IFFT data is output after the operation is completed. The module G processes the output data of the module D and sends the processed data to a wireless channel.

For the windowing mode 2, the module A configures the task, configures the current symbol related data, parameters, and the read address and data of the windowing coefficients. The module B parses the task configured by the module A, and starts to perform an IFFT processing according to the configured parameters. The data with a tail length of CP is acquired from the output data of the module B, and is put at the head of the current symbol data queue.

If the module A is configured with the windowing mode 2, and at this time, the data is input into the module E, the module E performs a data caching and windowing operation according to the processing flow of the windowing mode 2, and the current IFFT data is output after the operation is completed. The module G processes the output data of the module E and sends the processed data to a wireless channel.

For the windowing mode 3, the module A configures the task, configures the current symbol related data, parameters, and the read address and data of the windowing coefficients. The module B parses the task configured by the module A, and starts to perform an IFFT processing according to the configured parameters. The data with a tail length of CP is acquired from the output data of the module B, and is putting at the head of the current symbol data queue. If the module A is configured with the windowing mode 3, and at this time, the data is input into the module F, the module F performs a data caching and windowing operation according to the processing flow of the windowing mode 3, and the current IFFT data is output after the operation is completed. The module G processes the output data of the module F and sends the output data to a wireless channel.

Through the description of the above embodiments, those skilled in the art may understand that the method according to the above embodiments may be implemented by means of software plus a necessary universal hardware platform, and of course, may also be implemented by hardware. Based on this understanding, the technical scheme of the present application may be embodied in the form of a software product, which is stored in a storage medium (such as a Read-Only Memory (ROM)/Random Access Memory (RAM), a magnetic disk, an optical disc), and includes several instructions for causing a terminal device (which may be a mobile phone, a computer, a server, or a network device, etc.) to perform the methods described in the embodiments of the present application.

An OFDM time domain windowing apparatus is further provided in this embodiment, the apparatus is used for implementing the above embodiments and optional implementations, which have been explained without further details. The term "module" as used below may be a combination of software and/or hardware that implements a predetermined function. Although the apparatus described in the following embodiments may be implemented in software, implementations in hardware, or a combination of software and hardware, are also possible and contemplated.

Figure 14:
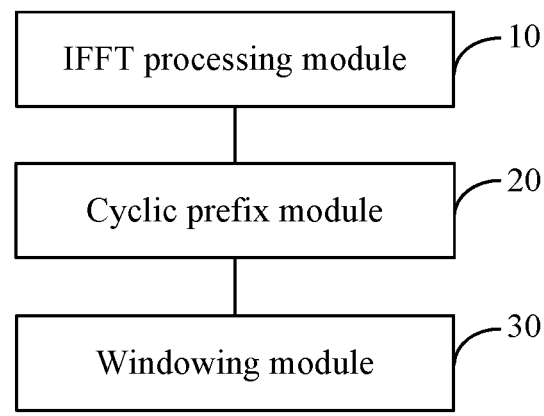
FIG. 14 is a block structure diagram of an OFDM time domain windowing apparatus according to an embodiment of the present application.

FIG. 14 is a block structure diagram of an OFDM time domain windowing apparatus according to an embodiment of the present application, the apparatus includes an IFFT processing module 10, a cyclic prefix module 20 and a windowing module 30, as shown in FIG. 14.

The IFFT processing module 10 is configured to parse current OFDM symbol data according to a configuration task, and perform an inverse fast fourier transform (IFFT) processing on the current OFDM symbol data to obtain IFFT data.

The cyclic prefix module 20 is configured to add a cyclic prefix (CP) to the IFFT data.

The windowing module 30 is configured to determine a time domain windowing mode of the current OFDM symbol data according to the configuration task, perform a windowing operation on IFFT data added with the CP according to the determined time domain windowing mode, and output IFFT data after performing the windowing operation.

The multiple modules described above may be implemented by software or hardware, and for the latter, without limitation, may be implemented in the following manner: the modules described above are all located in a same processor; or the multiple modules described above are located in different processors in an arbitrary combination manner, respectively.

Embodiments of the present application further provide a non-transitory computer-readable storage medium. The non-transitory computer-readable storage medium stores a computer program, where the computer program is configured to, when executed, perform the steps of any of the method embodiments described above.

Optionally, in this embodiment, the storage medium described above may include, but is not limited to, a USB flash disk, a ROM, a RAM, a removable disk, a magnetic disk, or an optical disk, among multiple media in which the computer program may be stored.

An embodiment of the present application further provides an electronic apparatus. The electronic apparatus includes a memory and a processor. The memory stores a computer program, and the processor is configured to execute the computer program to perform the steps of any of the method embodiments described above.

Optionally, the electronic apparatus described above may further include a transmission device and an input/output device, the transmission device is connected to the processor, and the input/output device is connected to the processor.

Optionally, examples in this embodiment may be referred to the examples described in the above embodiments and optional embodiments, and this embodiment is not described in detail herein.

It should be understood by those skilled in the art that the above-mentioned modules or steps of the present application may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

What is claimed is:

1. An orthogonal frequency division multiplexing (OFDM) time domain windowing method, comprising:

parsing current OFDM symbol data according to a configuration task, and performing an inverse fast fourier transform (IFFT) processing on the current OFDM symbol data to obtain IFFT data;

adding a cyclic prefix (CP) to the IFFT data; and determining a time domain windowing mode of the current OFDM symbol data according to the configuration task, performing a windowing operation on IFFT data added with the CP according to the determined time domain windowing mode, and outputting IFFT data after performing the windowing operation;

wherein performing the windowing operation on the IFFT data added with the CP according to the determined time domain windowing mode comprises:

in a case where the time domain windowing mode is a first windowing mode, acquiring data with a length of A0 from a head of a previous OFDM symbol to be copied as a cyclic suffix, and forming a data segment B1 by the cyclic suffix and last data with a length of A0 of the previous OFDM symbol; acquiring data with the length of A0 from a head of the CP of a current OFDM symbol and then acquiring data with the length of A0 before the CP to form a data segment A2, wherein a length of 2×A0 is equal to a length of the CP; multiplying the data segment A2 by a rising window coefficient to obtain windowed data of the data segment A2, multiplying the data segment B1 by a falling window coefficient to obtain windowed data of the data segment B1, and superposing the windowed data of the data segment A2 and the windowed data of the data segment B1 to obtain a data segment C; and replacing the last data with the length of A0 of the previous OFDM symbol with data with a front length of A0 of the data segment C, and replacing data with the front length of A0 of the CP of the current OFDM symbol with data with a rear length of A0 of the data segment C;

in a case where the time domain windowing mode is a second windowing mode, acquiring data with a length of 2×A0 from a head of a previous OFDM symbol to be copied as a cyclic suffix data segment B1, wherein the length of 2×A0 is less than or equal to a length of the CP; acquiring a data segment A1 with the length of 2×A0 from a head of the CP of a current OFDM symbol; and multiplying the data segment A1 by a rising window coefficient to obtain windowed data of the data segment A1, multiplying the data segment B1 by a falling window coefficient to obtain windowed data of the data segment B1, and superposing the windowed data of the data segment A1 and the windowed data of the data segment B1 to obtain a data segment C, replacing the data segment A1 of the current OFDM symbol with the data segment C, and reserving a remaining data segment A2 of the CP of the current OFDM symbol as the CP; or in a case where the time domain windowing mode is a third windowing mode, acquiring a data segment A with a length of 2×A0 from a head of a CP of a current OFDM symbol, wherein the length of 2×A0 is less than a length of the CP; multiplying the data segment A by a rising window coefficient to replace data of the data segment A; and acquiring a data segment B with the length of 2×A0 from a last symbol of the current OFDM symbol, and multiplying the data segment B by a falling window coefficient to replace data of the data segment B.

2. The method of claim 1, wherein before parsing the current OFDM symbol data according to the configuration task, the method further comprises:

performing a task configuration on the current OFDM symbol data, wherein the configuration task comprises a task parameter, a reading address of windowing data, and a windowing coefficient of windowing data.

3. The method of claim 1, wherein performing the windowing operation on the IFFT data added with the CP according to the determined time domain windowing mode comprises:

in a case where the time domain windowing mode is a windowing bypass mode, directly outputting the IFFT data added with the CP to a subsequent module.

4. The method of claim 1, wherein after the IFFT data after performing the windowing operation is output, the method further comprises:

collating the IFFT data after performing the windowing operation, and transmitting the collated IFFT data through a wireless channel.

5. A non-transitory computer-readable storage medium, storing a computer program, wherein the computer program is configured to, when executed, perform the method of claim 1.

6. An electronic apparatus, comprising a memory and a processor, wherein the memory storing processor-executable instructions which, when executed by the processor, cause the processor to:

parse current OFDM symbol data according to a configuration task, and perform an inverse fast fourier transform (IFFT) processing on the current OFDM symbol data to obtain IFFT data;

add a cyclic prefix (CP) to the IFFT data; and determine a time domain windowing mode of the current OFDM symbol data according to the configuration task, perform a windowing operation on IFFT data added with the CP according to the determined time domain windowing mode, and output IFFT data after performing the windowing operation;

wherein the processor-executable instructions which, when executed by the processor, cause the processor to perform the windowing operation on the IFFT data added with the CP according to the determined time domain windowing mode in the following way:

in a case where the time domain windowing mode is a first windowing mode, acquiring data with a length of A0 from a head of a previous OFDM symbol to be copied as a cyclic suffix, and forming a data segment B1 by the cyclic suffix and last data with a length of A0 of the previous OFDM symbol; acquiring data with the length of A0 from a head of the CP of a current OFDM symbol and then acquiring data with the length of A0 before the CP to form a data segment A2, wherein a length of 2×A0 is equal to a length of the CP; multiplying the data segment A2 by a rising window coefficient to obtain windowed data of the data segment A2, multiplying the data segment B1 by a falling window coefficient to obtain windowed data of the data segment B1, and superposing the windowed data of the data segment A2 and the windowed data of the data segment B1 to obtain a data segment C; and replacing the last data with the length of A0 of the previous OFDM symbol with data with a front length of A0 of the data segment C, and replacing data with the front length of A0 of the CP of the current OFDM symbol with data with a rear length of A0 of the data segment C;

in a case where the time domain windowing mode is a second windowing mode, acquiring data with a length of 2×A0 from a head of a previous OFDM symbol to be copied as a cyclic suffix data segment B1, wherein the length of 2×A0 is less than or equal to a length of the CP; acquiring a data segment A1 with the length of 2×A0 from a head of the CP of a current OFDM symbol; and multiplying the data segment A1 by a rising window coefficient to obtain windowed data of the data segment A1, multiplying the data segment B1 by a falling window coefficient to obtain windowed data of the data segment B1, and superposing the windowed data of the data segment A1 and the windowed data of the data segment B1 to obtain a data segment C, replacing the data segment A1 of the current OFDM symbol with the data segment C, and reserving a remaining data segment A2 of the CP of the current OFDM symbol as the CP; or in a case where the time domain windowing mode is a third windowing mode, acquiring a data segment A with a length of 2×A0 from a head of a CP of a current OFDM symbol, wherein the length of 2×A0 is less than a length of the CP; multiplying the data segment A by a rising window coefficient to replace data of the data segment A; and acquiring a data segment B with the length of 2×A0 from a last symbol of the current OFDM symbol, and multiplying the data segment B by a falling window coefficient to replace data of the data segment B.

7. The electronic apparatus of claim 6, wherein the processor-executable instructions which, when executed by the processor, cause the processor to further perform:

performing a task configuration on the current OFDM symbol data, wherein the configuration task comprises a task parameter, a reading address of windowing data, and a windowing coefficient of windowing data.

8. The electronic apparatus of claim 6, wherein the processor-executable instructions which, when executed by the processor, cause the processor to perform the windowing operation on IFFT data added with the CP according to the determined time domain windowing mode in the following way:

in a case where the time domain windowing mode is a windowing bypass mode, directly outputting the IFFT data added with the CP to a subsequent module.

9. The electronic apparatus of claim 6, wherein the processor-executable instructions which, when executed by the processor, cause the processor to further perform:

collating the IFFT data after performing the windowing operation, and transmitting the collated IFFT data through a wireless channel.

10. The method of claim 2, wherein after the IFFT data after performing the windowing operation is output, the method further comprises:

collating the IFFT data after performing the windowing operation, and transmitting the collated IFFT data through a wireless channel.

11. The method of claim 3, wherein after the IFFT data after performing the windowing operation is output, the method further comprises:

collating the IFFT data after performing the windowing operation, and transmitting the collated IFFT data through a wireless channel.

* * * * *